US011160047B2

(12) United States Patent
Wirola et al.

(10) Patent No.: US 11,160,047 B2
(45) Date of Patent: Oct. 26, 2021

(54) DETERMINING MOTION INFORMATION ASSOCIATED WITH A MOBILE DEVICE

(71) Applicant: HERE Global B.V., Eindhoven (NL)

(72) Inventors: Lauri Aarne Johannes Wirola, Tampere (FI); Marko Luomi, Lempäälä (FI); Petri Rauhala, Tampere (FI)

(73) Assignee: Here Global B.V., Eindhoven (NL)

( * ) Notice: Subject to any disclaimer, the term of this patent is extended or adjusted under 35 U.S.C. 154(b) by 0 days.

(21) Appl. No.: 16/780,982

(22) Filed: Feb. 4, 2020

(65) Prior Publication Data

US 2020/0252751 A1    Aug. 6, 2020

(30) Foreign Application Priority Data

Feb. 4, 2019    (EP) ..................................... 19155330

(51) Int. Cl.
*H04W 64/00* (2009.01)
*G01S 13/60* (2006.01)
(Continued)

(52) U.S. Cl.
CPC ......... *H04W 64/003* (2013.01); *G01S 13/605* (2013.01); *G01S 19/256* (2013.01); *H04W 4/027* (2013.01)

(58) Field of Classification Search
CPC ... H04W 4/027; H04W 4/023; H04W 64/003; H04W 64/006; H04W 4/025; G01S 19/256; G01S 5/10; G01S 13/582; G01S 13/605
See application file for complete search history.

(56) References Cited

U.S. PATENT DOCUMENTS 8,712,427 B2 *  4/2014  Bienas .................... H04W 4/24
                                                      455/456.1
9,213,082 B2   12/2015  Aggarwal et al.
(Continued)

FOREIGN PATENT DOCUMENTS

WO    WO 2007/002416 A1    1/2007
WO    WO 2013/176998 A2    11/2013
WO    WO 2014/055845 A1    4/2014

OTHER PUBLICATIONS

Extended European Search Report for Application No. EP 191553330.4 dated Aug. 6, 2019, 8 pages.
(Continued)

*Primary Examiner* — Magdi Elhag
(74) *Attorney, Agent, or Firm* — Alston & Bird LLP

(57) ABSTRACT

A method, apparatus and computer readable storage medium are provided to determine motion information associated with a mobile device. A plurality of signal propagation time parameters are obtained or determined. Each signal propagation time parameter is associated with a respective observation position of the mobile device and a respective installation position a radio device. Each signal propagation time parameter is representative of a respective signal propagation time value of radio signal(s) traveling between the respective observation position and the respective installation position. For each of the installation positions of the radio devices, respective point coordinates are determined that represent the respective installation position of the respective radio device, at least partially based on the signal propagation time parameters. Motion information associated with the mobile device is determined at least partially based on the signal propagation time parameters and the point coordinates that have been determined.

20 Claims, 4 Drawing Sheets

(51) Int. Cl.
*H04W 4/02* (2018.01)
*G01S 19/25* (2010.01)

(56) References Cited

U.S. PATENT DOCUMENTS

| | | | |
|---|---|---|---|
| 9,213,093 | B2 | 12/2015 | Do et al. |
| 9,291,704 | B2 | 3/2016 | Sridhara et al. |
| 9,320,010 | B2 | 4/2016 | Segev |
| 9,459,337 | B2 | 10/2016 | Aldana et al. |
| 9,482,741 | B1 * | 11/2016 | Min ................ G01S 5/0242 |
| 2010/0135178 | A1 * | 6/2010 | Aggarwal ............ G01S 5/14 370/252 |
| 2014/0022920 | A1 * | 1/2014 | Dua ................. G01S 13/765 370/252 |
| 2014/0302870 | A1 * | 10/2014 | Cui ..................... G01S 3/04 455/456.1 |
| 2017/0059715 | A1 * | 3/2017 | Wietfeldt ............ G01S 19/28 |
| 2018/0295473 | A1 | 10/2018 | Wirola et al. |
| 2019/0045477 | A1 * | 2/2019 | Edge .................. H04W 24/08 |

OTHER PUBLICATIONS

Accurate and Integrated Localization System for Indoor Environments Based on IEEE 802.11 Round-Trip Time Measurements [online] [retrieved Aug. 14, 2018]. Retrieved via the Internet: http://jwcn-eurasipjournals.springeropen.com/articles/10.1155/2010/102095 (dated May 6, 2010), 18 pages.

Levenberg-Marquardt algorithm—Wikipedia [online] [retrieved Mar. 5, 2020]. Retrieved via the Internet: https://web.archive.org/web/20190131045229/https://en.wikipedia.org/wiki/Levenberg-Marquardt_algorithm (dated Jan. 31, 2019) 6 pages.

802.11-2016—IEEE Standard for Information technology—Telecommunications and information exchange between systems Local and metropolitan area networks—Specific requirements—Part 11: Wireless LAN Medium Access Control (MAC) and Physical Layer (PHY) Specifications (Dec. 14, 2016), 2 pages.

Office Action for European Application No. 19155330.4 dated Sep. 3, 2021, 3 pages.

* cited by examiner

DETERMINING MOTION INFORMATION ASSOCIATED WITH A MOBILE DEVICE

CROSS-REFERENCE TO RELATED APPLICATIONS

This application claims priority to European Application No. 19155330.4, filed Feb. 4, 2019, the entire contents of which are incorporated herein by reference.

FIELD OF THE DISCLOSURE

The invention relates to the field of radio positioning and more specifically to determining motion information associated with a mobile device.

BACKGROUND

Satellite signal based positioning technologies, which are mainly used outdoors, are usually not suited to deliver a satisfactory performance when used for indoor positioning of a mobile device, since satellite signals of global navigation satellite systems (GNSS), like the global positioning system (GPS) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated non-GNSS based radio positioning systems for indoor and outdoor positioning have been developed and commercially deployed during the past years. Examples comprise systems that are based on pseudolites, which are ground based GPS-like short-range beacons, ultra-sound positioning systems, Bluetooth low energy (BLE) based positioning systems, cellular network based positioning systems and wireless local area network (WLAN) based positioning systems.

Determining the position of the mobile device based on such non-GNSS based radio positioning systems may be assisted by motion information associated with the mobile device, which are determined by motion sensors (for example an accelerometer or a gyroscope). However, conventional motion sensors have several shortcomings, which result in inaccurate positioning of the mobile device.

SUMMARY OF SOME EMBODIMENTS OF THE INVENTION

According to an exemplary aspect of the invention, a method comprises:
obtaining or determining a plurality of signal propagation time parameters, wherein each of the plurality of signal propagation time parameters is associated with a respective observation position of a plurality of observation positions of a mobile device and a respective installation position of a plurality of installation positions of a plurality of radio devices, and wherein each of the signal propagation time parameters is representative of a respective signal propagation time value of one or more radio signals traveling between the respective observation position and the respective installation position,
determining, for each of the plurality of installation positions of the plurality of radio devices, respective point coordinates of a coordinate system representing the respective installation position of the respective radio device, at least partially based on the plurality of signal propagation time parameters, and
determining motion information associated with the mobile device, at least partially based on the plurality of signal propagation time parameters and the point coordinates obtained as a result of the determining, for each of the plurality of installation positions of the plurality of radio devices, respective point coordinates.

The disclosed method may be performed by an apparatus. Moreover, the apparatus performing the disclosed method may be part of a radio positioning system (e.g. the below disclosed radio positioning system). In particular, the apparatus may be the mobile device.

The mobile device may be an Internet-of-Thing (IoT) device, a smart home device, a smartphone, a tablet computer, a notebook computer, a smart watch and a smart band.

The plurality of radio devices may be part of a radio positioning system (e.g. the below disclosed radio positioning system). By way of example, the plurality of radio devices and the apparatus (e.g. the mobile device) performing the disclosed method may be part of the same radio positioning system (e.g. the below disclosed radio positioning system).

An installation position of a respective radio device of the plurality of radio devices may be understood to be a fixed position at which the respective radio device has been installed and/or is operated. For example, each of the plurality of radio devices may be configured to transmit a radio signal and/or to receive a radio signal.

A respective signal propagation time parameter of the plurality of signal propagation time parameters may be understood to be associated with a respective installation position of the plurality of installation positions and a respective observation position if the respective signal propagation time parameter of the plurality of signal propagation time parameters is representative of a respective signal propagation time value of one or more radio signals traveling between the respective installation position and the respective observation position.

Accordingly, the respective observation associated with a respective one of the of signal propagation time parameters may be understood to be an arbitrary position (e.g. a position of the mobile device) at which the respective signal propagation time value has been observed (e.g. determined).

It is to be understood that, for at least some (e.g. each) of the plurality of signal propagation time parameters, the respective installation position and the respective observation position associated with the respective signal propagation time parameter of the plurality of signal propagation time parameters is unknown (e.g. unknown before performing the disclosed method).

The respective signal propagation time value of one or more radio signals traveling between the respective installation position of a radio device and the respective observation position of a mobile device may be understood to be a round-trip-time value which represents the round-trip-time period it took for a first radio signal to travel from a mobile device located at the respective observation position to a radio device installed at the respective installation position and for a second radio signal to travel from the radio device to the mobile device. Accordingly, the round-trip-time value $RTT_{i,k}$ of radio signal traveling between the k-th installation position and the i-th observation position may be determined by the following equation:

$$RTT_{i,k} = (t_4 - t_1) - (t_3 - t_2)$$

where $t_1$ is the time-of-departure of the first radio signal from the mobile device located at the i-th observation position, $t_4$ is the time-of-arrival of the second radio signal at the mobile device, $t_3$ is the time-of-departure of the second radio signal from the radio device installed at the k-th installation position and $t_2$ is the time-of-arrival of the first radio signal at the radio device. For example, the mobile device located at the i-th observation position and the radio device installed at the k-th installation position may capture the respective times-of-arrival and times-of-departure. To enable the mobile device to determine the round-trip-time value, the radio device may communicate the time-of-departure of the second radio signal from the radio device and the time-of-arrival of the first radio signal at the radio device to the mobile device. Alternatively, the radio device may transmit the first radio signal and the mobile device may transmit the second radio signal. Both alternatives are to be understood to be within the scope of the present invention. Moreover, it is to be understood that the invention is not limited to these alternatives.

Further alternatively, the respective signal propagation time value may for example be understood to be a one-way-time value which represents the one-way-time period it took for a radio signal to travel in a one-way direction from one of the radio device installed at the respective installation position and the mobile device located at the respective observation position to the other one. Accordingly, the one-way-time value $OWT_{ik}$ of radio signal traveling between the k-th installation position and the i-th observation position may be determined by the following equation:

$$OWT_{i,k} = t_1 - t_2$$

where $t_1$ is the time-of-departure of the radio signal and $t_2$ is the time-of-arrival of the radio signal. For example, the mobile device located at the i-th observation position and the radio device installed at the k-th installation position may capture the time-of-arrival and the time-of-departure. To enable the mobile device to determine the round-trip-time value, the radio device may communicate the time-of-departure of the radio signal or the time-of-arrival of the radio signal captured by the radio device to the mobile device. In contrast to determining a round-trip-time value, determining one-way-time value however requires that the clocks of the mobile device and the radio device are synchronized.

Accordingly, the respective observation associated with a respective one of the plurality of signal propagation time parameters may be understood to be the position of the mobile device when capturing the respective time(s)-of-arrival and/or time(s)-of-departure for determining the one-way-time value or a round-trip-time value represented by the respective one of the plurality of signal propagation time parameters.

For example, each of the plurality of signal propagation time parameters is representative of a respective signal propagation time value determined by the mobile device at least partially based on respective time(s)-of-departure and time(s)-of-arrival captured by the mobile device and a respective radio device of the plurality of radio devices. Accordingly, the plurality of signal propagation time parameters may be obtained by receiving the plurality of signal propagation time parameters from the mobile device. For example, the plurality of signal propagation time parameters may not be received at once from the mobile device, but may at least partially be received subsequently from the mobile device.

That each of the plurality of signal propagation time parameter is representative of a respective signal propagation time value may be understood to mean that (1) the respective signal propagation time parameter contains or represents the respective signal propagation time value or that (2) the respective signal propagation time parameter contains or represents a respective value that is a function of the respective signal propagation time value. For example, a respective distance value representing the distance between the respective installation position and the respective observation position is a function of the respective signal propagation time value. In particular, the respective distance value $d_{i,k}$ between the k-th installation position and the i-th observation position may be determined based on the respective signal propagation time value representing a round-trip-time value $RTT_{i,k}$ or a one-way-time value $OWT_{i,k}$ by one of the following equations:

$$d_{i,k} = RTT_{i,k} \cdot \frac{c}{2}$$

$$d_{i,k} = OWT_{i,k} \cdot c$$

where c is the speed of light.

Point coordinates of a coordinate system may be understood to define a position of a point in the coordinate system.

Moreover, the coordinate system may be a local coordinate system which may be understood to mean that it is not fixed to a fixed point on earth such that point coordinates of the local coordinate system may be (e.g. only) used for defining or representing a relative location of a position. In contrast to this, a global coordinate system may be understood to be fixed to a fixed point on earth such that geographical coordinates of such a global coordinate system may be used for defining or representing an absolute position.

To give an non limiting example, such a local coordinate system may for example be defined by selecting a signal propagation time parameter of the plurality of signal propagation time parameters and by selecting first point coordinates of the coordinate system to represent the installation position associated with the selected signal propagation time parameter and by selecting second point coordinates of the coordinate system to represent the observation position associated with the selected signal propagation time parameter. The points in the local coordinate system defined by the first and second point coordinates selected to represent the respective installation position and the respective observation position may be considered to represent the respective installation position and the respective observation position relative to each other. In other words, these points may be considered to be a representation of the relative locations of the respective installation position and the respective observation position. For example, the distance between these points in the local coordinate system defined by the first and second point coordinates may be considered to be a representation of the distance between the respective installation position and the respective observation position. Accordingly, mapping rules for mapping any position based on its relative location to one of the respective installation position and the respective observation position represented by the first and second point coordinates to a respective point in the local coordinate system may be considered to be defined by selecting the first point coordinates of the coordinate system to represent the installation position associated with the selected signal propagation time parameter and by selecting second point coordinates of the coordinate system to represent the observation position associated with the selected signal propagation time parameter. Accordingly, defining a local coordinate system may be understood to mean that such mapping rules are defined.

Determining, for each of the plurality of installation positions, respective point coordinates of the coordinate system representing the respective installation position may be performed according to predetermined rules like a predetermined algorithm and/or predetermined equations. For example, the plurality of signal propagation time parameters and, optionally, the first point coordinates and the second point coordinates defining a local coordinate system as disclosed above may be used as input parameters of such a predetermined algorithm and/or as parameters of such predetermined equations. These point coordinates obtained as a result of the determining may form a first plurality of point coordinates. For example, the determining may be performed such that the first plurality of point coordinates is a representation of relative locations of the plurality of installation positions. To this end, the above disclosed mapping rules, for example in the form of the first and second point coordinates defining a local coordinate system as disclosed above, may be considered when determining the point coordinates.

Motion information associated with a mobile device may represent or may be characteristic of a motion of the mobile device, such as for example a distance traveled by the mobile device, a speed (e.g. an average speed) or a speed profile of the mobile device, an acceleration (e.g. an average acceleration) or an acceleration profile of the mobile device or a trajectory of the mobile device. Determining motion information associated with the mobile device may be performed according to predetermined rules like a predetermined algorithm and/or predetermined equations. That the determining is at least partially based on the plurality of signal propagation time parameters and the determined point coordinates (e.g. the first plurality of point coordinates) may be understood to mean that for example based on the respective signal propagation time values represented by the plurality of signal propagation time parameters, the point coordinates of the observation position of the mobile device may be determined relatively to the determined point coordinates of the plurality of installation positions. For example, a respective distance value representing the distance between the respective installation position and the respective observation position may be used to determine the respective observation position relatively to the respective installation position. When for example the mobile device moves through an indoor environment, repeatedly (for example according to a predetermined time interval, such as for example every second) determining the observation position of the mobile device relatively to the installation positions may result in motion information associated with the mobile device, wherein the motion information may represent or may be determined based on various observation positions of the mobile device over time as disclosed below in more detail.

For example, determining the position of the mobile device may be assisted by motion information representing or being characteristic of a motion of the mobile device. However, conventional motion sensors have several shortcomings, which may result in inaccurate positioning of the mobile device. For example, conventional motion sensors may be based on step detection and estimating the step length of the user of the mobile device. Thus, any missed step or mismatch in the step length accumulates as growing error when determining the motion information. Apart from this, if a user carrying the mobile device takes a turn, determining motion information may rely on accurately determine the device orientation before and/or after the turn. Thus, potential inaccuracies in determining the device orientation also accumulates as growing error when determining the motion information. Instead of determining motion information associated with a mobile device by means of conventional motion sensors, it may therefore be advantageous to determine motion information associated with the mobile device at least partially based on the respective point coordinates determined for each of the plurality of installation positions of the plurality of radio devices as disclosed above. As another advantage, the disclosed method may be used for determining motion information associated with the mobile device even if at least some (for example each) of the plurality of installation positions of the plurality of radio devices are unknown. As another advantage, the disclosed method may be performed by a mobile device, which may allow for a flexible and effortless implementation of the disclosed method.

According to a further exemplary aspect of the invention, an apparatus is disclosed, wherein the apparatus comprises means for performing the steps of any one embodiment of the disclosed method or a part thereof (e.g. at least some steps of any one embodiment of the disclosed method).

For example, the disclosed apparatus(s) may be (a) module(s) or component(s) for (a) device(s), for example (a) chip(s) or chipset(s). Alternatively, the disclosed apparatus(es) may be (a) device(s). Examples of such (a) device(s) are (1) a mobile device, (2) a server and (3) a plurality of servers (e.g. forming a server cloud). As another non-limiting example, the apparatus may be part of a radio positioning system (e.g. the below disclosed radio positioning system). In particular, the apparatus may be a positioning server of a radio positioning system.

The means of the disclosed apparatus can be implemented in hardware and/or software. They may comprise for instance a processor for executing computer program code (e.g. computer program code as disclosed below) for realizing the required functions, a memory storing the computer program code, or both. Alternatively, they could comprise for instance circuitry that is designed to realize the required functions, for instance implemented in a chipset or a chip, like an integrated circuit. The disclosed apparatus may comprise a single means for all functions, a common plurality of means for all functions, or a plurality of different means for different functions.

According to a further exemplary aspect of the invention, an apparatus is disclosed, wherein the apparatus comprises at least one processor and at least one memory containing computer program code (e.g. computer program code as disclosed below), the at least one memory and the computer program code with the at least one processor configured to cause the apparatus at least to perform any one embodiment of the disclosed method (e.g. the steps of any one embodiment of the disclosed method) or a part thereof (e.g. at least some steps of any one embodiment of the disclosed method).

It is to be understood that the disclosed apparatus(es) may comprise only the disclosed components (e.g. means) or may further comprise one or more additional components (e.g. means). Examples of such additional components are a radio interface (e.g. a receiver, a transmitter and/or a transceiver), a data interface, a user interface (e.g. a touch-sensitive display, a keyboard, a touchpad, a display, etc.), a sensor, etc.

According to a further exemplary aspect of the invention, a radio positioning system is disclosed which comprises the plurality of radio devices and at least one of the mobile device and the disclosed apparatus(es).

According to a further exemplary aspect of the invention, a non-transitory computer readable storage medium is disclosed, in which computer program code is stored. The computer program code causes an apparatus to perform any one embodiment of the disclosed method (e.g. the steps of any one embodiment of the disclosed method) when executed by a processor or by a plurality of processors of the apparatus. The computer program code could be stored in the computer readable storage medium in the form of instructions encoding the computer-readable storage medium. The computer readable storage medium may be intended for taking part in the operation of an apparatus, like an internal or external hard disk of the device, or be intended for distribution of the computer program code, like an optical disc.

According to a further exemplary aspect of the invention, a computer program code is disclosed, the computer program code when executed by a processor (or by a plurality of processors) of an apparatus causing the apparatus to perform any one embodiment of the disclosed method (e.g. the steps of any one embodiment of the disclosed method).

The disclosed method, apparatus(es), system, non-transitory computer readable storage medium and computer program code may be for determining motion information associated with a mobile device.

In the following, further features and embodiments of these exemplary aspects of the invention will be described.

According to an exemplary embodiment of the invention, the method further comprises:
determining, for each of the plurality of observation positions, respective point coordinates of the coordinate system representing the respective observation position at least partially based on the plurality of signal propagation time parameters.

The determining, for each of the plurality of observation positions, respective point coordinates of the coordinate system representing the respective observation may be understood to be performed like the above disclosed determining of respective point coordinates for each of the plurality of installation positions of the plurality of radio devices. In particular, the determining may be performed according to predetermined rules like a predetermined algorithm and/or predetermined equations. For example, the plurality of signal propagation time parameter and, optionally, the first point coordinates and the second point coordinates defining a local coordinate system as disclosed above may be used as input parameters of such a predetermined algorithm and/or as parameters of such predetermined equations.

Alternatively or additionally, respective point coordinates of the coordinate system representing may be determined for some (e.g. each) of the plurality of observation positions according to a trilateration algorithm, for which the above disclosed plurality of signal propagation time parameters and the point coordinates obtained as a result of the determining, for each of the plurality of installation positions of the plurality of radio devices, respective point coordinates, for example by determining the distance between a respective observation position and three different installation positions based on at least three different signal propagation time values, the observation position of the mobile device may be estimated relative to the at least three installation positions.

These point coordinates obtained as a result of the determining may form a second plurality of point coordinates. For example, the determining may be performed such that the second plurality of point coordinates are a representation of relative locations of the plurality of observation positions. To this end, the above disclosed mapping rules, for example in the form of the first and second point coordinates defining a local coordinate system as disclosed above, may be considered when determining the point coordinates.

For example, the above disclosed determining of motion information comprises the determining of respective point coordinates representing each of the plurality of observation positions of the mobile device. To this end, respective point coordinates representing each of the plurality of observation positions of the mobile device may additionally include respective time information (for example a time stamp) representing the time at which the mobile device was located at the respective observation position.

According to an exemplary embodiment of the invention, the method further comprises:
selecting a signal propagation time parameter of the plurality of signal propagation time parameters for defining the coordinate system, wherein first point coordinates of the coordinate system are selected to represent the installation position associated with the selected signal propagation time parameter, and second point coordinates of the coordinate system are selected to represent the observation position associated with the selected signal propagation time parameter.

As disclosed above in more detail, the coordinate system may be a local coordinate system which may for example be defined by selecting a signal propagation time parameter of the plurality of signal propagation time parameters and by selecting first point coordinates of the coordinate system to represent the installation position associated with the selected signal propagation time parameter and by selecting second point coordinates of the coordinate system to represent the observation position associated with the selected signal propagation time parameter.

For example, the first point coordinates and the second point coordinates are selected such that a distance between the first point coordinates and the second point coordinates is proportional to the signal propagation time value represented by the selected signal propagation time parameter.

As disclosed above, a respective distance value representing the distance between a respective installation position and a respective observation position associated with a respective signal propagation time parameter is a function of the respective signal propagation time value represented by the respective signal propagation time parameter. If it is assumed that the first point coordinates represent the first installation position (i.e. k=1) and the second point coordinates represent the first observation position (i=1), the respective distance value $d_{1,1}$ may be determined based on the respective signal propagation time value representing a round-trip-time value $RTT_{1,1}$ or a one-way-time value $OWT_{1,1}$ by one of the following equations:

$$d_{1,1} = RTT_{1,1} \cdot \frac{c}{2}$$

$$d_{1,1} = OWT_{1,1} \cdot c$$

where c is the speed of light.

Accordingly, if the first point coordinates are selected to be origin coordinates of a two-dimensional Cartesian coordinate system, the second point coordinates may be selected to be point coordinates defining a point on the X- or Y-axis of the coordinate system having a distance d from the origin point of the coordinate system. For example, the first point coordinates may then be represented by the following two-dimensional vector:

$$y_1 = \begin{pmatrix} 0 \\ 0 \end{pmatrix},$$

and the second point coordinates may then be represented by the following two-dimensional vector:

$$x_1 = \begin{pmatrix} 0 \\ d_{1,1} \end{pmatrix}.$$

It is however to be understood that the present invention is not limited to such a two-dimensional Cartesian coordinate system.

According to an exemplary aspect of the invention, the motion information associated with the mobile device represent at least one of the following:
  a distance traveled by the mobile device,
  a speed or speed profile of the mobile device,
  an acceleration or an acceleration profile of the mobile device,
  a motion direction or a motion orientation of the mobile device,
  a trajectory of the mobile device.

For example, when the mobile device moves through an indoor environment, motion information may represent respective point coordinates of each of the plurality of observation positions that has been determined by the mobile device at various points in time. As disclosed above, respective point coordinates representing each of the plurality of observation positions of the mobile device may additionally include respective time information (for example a time stamp) representing the time at which the mobile device was located at the respective observation position. Accordingly, the trajectory may be understood to be a chronologically ordered sequence of the plurality of observation positions at which the mobile device was located. Within this example, the distance traveled by the mobile device moving through an indoor environment may be determined based on the relative distance between consecutive (e.g. subsequent) observation positions in the trajectory of the mobile device. For example, the distance traveled by the mobile device may be determined by adding up the respective distances between each pair of consecutive observation positions of the trajectory of the mobile device. Within this example, the speed of the mobile device may be determined as the speed (e.g. the average speed) at which the mobile device moves between two consecutive observation positions of the trajectory of the mobile device. For example, the speed may be determined by dividing the distance between two consecutive observation positions of the trajectory by the time difference between the respective times at which the mobile device was located at the respective observation position. Accordingly, the speed profile of the mobile device may be determined by determining the speed (e.g. the average speed) at which the mobile device moves between two respective consecutive observation positions of the trajectory for each pair of consecutive observation positions of the trajectory. As such, the speed profile may be understood to be a chronologically ordered sequence of a plurality of speed values representing the speed at which the mobile device moved at respective points in time or during respective time periods. Within this example, the acceleration (e.g. the average acceleration) of the mobile device may be determined by dividing the difference between two consecutive speed values of the speed profile by the time difference between the respective times at which the mobile device was moving at the respective consecutive speeds. Accordingly, the acceleration profile of the mobile device may be determined by determining the acceleration (e.g. the average acceleration) of the mobile device for each pair of consecutive speed values of the speed profile. As such, the acceleration profile may be understood to be a chronologically ordered sequence of a plurality of acceleration values representing the acceleration at which the mobile device moved at respective points in time. For example, the motion direction or the motion orientation of the mobile device may be understood to be the direction in which the mobile device moves while moving through an indoor environment. Considering the example above, two consecutive observation positions in the trajectory of the mobile device may be used to determine the motion direction or the motion orientation of the mobile device relatively to the installation positions. As such, the motion direction or the motion orientation for example may represent a degree value representing the angle between the direction in which the mobile device moves with respect to the installation position.

According to an exemplary aspect of the invention, the plurality of observation positions are subsequent positions of the mobile device. For example, when the mobile device moves through an indoor environment, the respective observation position of the mobile device may be determined repeatedly (for example according to a predetermined time interval, such as for example every second). As a result, the respective observation positions of the plurality of observation positions are determined in chronological order. In this example, the above disclosed trajectory of the mobile device may be determined by lining up the plurality of observation positions of the mobile device in the order in which they were determined.

According to an exemplary embodiment of the invention, the coordinate system is a two-dimensional or three-dimensional coordinate system. For example, the coordinate system may be one of (1) a Cartesian coordinate system, (2) a polar coordinate system, (3) a cylindrical coordinate system and (4) a spherical coordinate system, to name a few non limiting examples.

According to an exemplary embodiment of the invention, the method further comprises:
  determining, for at least one of the point coordinates representing the plurality of observation positions (i.e. at least one of the point coordinates of the second plurality of point coordinates as disclosed above) and/or for at least one of the point coordinates representing the plurality of installation positions (i.e. at least one of the point coordinates of the first plurality of point coordinates as disclosed above), a respective absolute position.

An absolute position may be understood to describe the location of the position based on or relative to a fixed position on earth. For example, an absolute position may be represented by geographical coordinates like longitude and latitude, for example coordinates according to WGS-84 (World Geodetic System 1984). WGS-84 is the standard U.S. Department of Defense definition of a global reference system for geospatial information and specifies a global coordinate system. It is presently available under: http://earth-info.nga.mil/GandG/publications/tr8350.2/wgs84fin.pdf. As a result of the determining, for at least one of the point coordinates of the coordinate system representing the plurality of installation positions and/or for at least one of the respective point coordinates representing the plurality observation positions, respective geographical coordinates may be obtained.

For example, if geographical coordinates representing at least three absolute positions of the plurality of installation positions and/or the plurality of observation positions are obtained, the above disclosed coordinate system may be fixed by fixing or mapping the points in the coordinate system representing these at least three positions to their absolute positions. Based on the accordingly fixed coordinate system (e.g. fixed to at least three fixed positions on earth), for each of the point coordinates of the coordinate system representing the plurality of installation positions and the plurality of observation positions of the mobile device, a respective absolute position may then be determined.

As an example, if the radio devices (e.g. the radio devices of the above disclosed radio positioning system) are installed in an indoor environment (e.g. a building), a mobile device carried by a user who is located inside the indoor environment (e.g. a building) may not be able to determine its observation position absolutely based on a GNSS-based positioning technology, when determining signal propagation time parameters. However, when the mobile device is located outside of the indoor environment, but still in the vicinity of the indoor environment, it may be able to determine its observation positions absolutely, for example based on a GNSS-based positioning technology, when determining signal propagation time parameters. In another example, a mobile device carried by a user may determine its observation position absolutely based on a GNSS-based positioning technology shortly before the user enters a building. After the user has entered the building, the mobile device may not be able to use a GNSS-based positioning technology for determining its observation position absolutely. In this case, at least partially based on the absolute position determined by the mobile device shortly before the user has entered the building and the determined motion information as disclosed above, the mobile device may determine absolute positions for its observation positions when being located indoors.

According to an exemplary embodiment of the invention, determining, for each of the plurality of installation positions of the plurality of radio devices, respective point coordinates of a coordinate system representing the respective installation position of the respective radio device comprises:
    solving a non-linear equation system, wherein the non-linear equation system is formed by a plurality of signal propagation time equations, and wherein each of the plurality of signal propagation time equations is at least partially based on a respective signal propagation time value represented by a respective signal propagation time parameter of the plurality of signal propagation time parameters.

Accordingly, determining, for each of the plurality of installation positions of the plurality of radio devices, respective point coordinates of a coordinate system representing the respective installation position of the respective radio device may further comprise determining the plurality of signal propagation time equations for example by:
    determining, for each of the plurality of signal propagation time parameters, a respective signal propagation time equation of the plurality of respective signal propagation time equations, wherein the respective point coordinates representing each of the plurality of installation positions associated with the respective signal propagation time parameter is an unknown variable of the respective signal propagation time equation, and wherein the respective signal propagation time value represented by the respective signal propagation time parameter is a parameter of the respective signal propagation time equation.

Examples of such a signal propagation time equation are:

$$c \cdot RTT_{i,k} = 2\|\underline{x}_i - \underline{y}_k\|$$

$$c \cdot OWT_{i,k} = \|\underline{x}_i - \underline{y}_k\|$$

where $\underline{x}_i$ represents the i-th observation position, $\underline{y}_k$ represents the k-th installation position, $RTT_{i,k}$ represents a round-trip-time value of a radio signal traveling between the k-th installation position and the i-th observation position, $OWT_{i,k}$ represents a one-way-time value of a radio signal traveling between the k-th installation position and the i-th observation position, and c represents the speed of light. Therein, the round-trip-time value $RTT_{i,k}$ or one-way-time value $OWT_{i,k}$ may be understood to be represented by a respective signal propagation time parameter of the plurality of signal propagation time parameters associated with the k-th installation position and the i-th observation position. Moreover, $\underline{x}_i$ and $\underline{y}_k$ may be two dimensional or three dimensional real vectors.

Without limiting the scope of the invention, it is assumed in the following for exemplary purposes that $\underline{x}_i$ and $\underline{y}_k$ are two dimensional vectors and that the coordinate system is a two dimensional Cartesian coordinate system. Considering the exemplary case that all k installation positions and all i observation positions are unknown, the plurality of signal propagation time parameters comprises i·k signal propagation time parameters and, thus, the number of signal propagation time equations is i·k. Moreover, the number of unknowns is 2·i+2·k (i.e. two point coordinates for each installation position and each observation position). By selecting the first point coordinates and the second point coordinates as disclosed above in more detail, the number of signal propagation time equations is reduced by 1 (i.e. i·k−1) and the number of unknowns by 4 (i.e. 2·i+2·k−4). Therefore, a necessary condition for the solving the non-linear equation system formed by the i·k signal propagation time equations is $$i \cdot k - 1 \geq 2k + 2i - 4$$
$$i \geq \frac{2k-3}{k-2} = \frac{2-3/k}{1-2/k}$$

For example, the first meaningful k is 3. Accordingly, k≥3 and i≥3 may be considered to be necessary condition for solving the non-linear equation system.

The non-linear equation system may for example be solved according to the Levenberg-Marquardt algorithm. For example, the problem defined by the non-linear equation system may be simply expressed as follows $$F\begin{pmatrix} x \\ y \end{pmatrix} = 0,$$

where $\underline{x}$ and $\underline{y}$ are the vectors representing point coordinates representing the k installation positions and the i observation positions, respectively. The solution of this problem determines, for each of the k installation positions and the i observation positions, respective point coordinates such that the signal propagation time equations are fulfilled. Accordingly, the point coordinates obtained as a solution of the problem together with the first point coordinates and the second point coordinates may be considered to be a representation of relative locations of the plurality of installation positions (i.e. k installation positions) and the plurality of observation positions (i.e. i observation positions). Each of these point coordinates may be understood to represent one of (1) a respective installation position of the plurality of installation positions and (2) a respective observation position of the plurality of observation positions.

As disclosed above, the non-linear equation system may be solved in two dimensions as well as in three dimensions. If the non-linear equation system is solved in two dimensions, information regarding the longitude and the latitude of the installation positions may be obtained. By solving the non-linear equation system in three dimensions, in addition to information regarding the longitude and the latitude of the installation positions information regarding the altitude of the installation positions may be obtained as well. However, solving the non-linear equation system in three dimensions is less robust than solving the non-linear equation system in two dimensions. Moreover, if the radio devices are installed in an indoor environment like a building or a complex of buildings, it may be hard to clearly map the altitude information to floors of the building. It may thus be beneficial to solve the non-linear equation system in two dimensions and for each floor separately. To this end, it may firstly be determined (for example based on barometric or motion information captured by the respective mobile device) on which floor a respective radio device resides.

According to an exemplary embodiment of the invention, each of the radio devices of the plurality of radio devices is one of:

a Bluetooth beacon; and an access point of a wireless local area network (WLAN).

A Bluetooth beacon may comprise a Bluetooth and/or Bluetooth low energy (BLE) radio interface, which includes at least a Bluetooth and/or BLE transmitter. The Bluetooth and/or BLE transmitter may also be a part of a Bluetooth and/or BLE transceiver. The Bluetooth and/or BLE radio interface may be configured to transmit Bluetooth and or BLE radio signals.

Such beacons can be easily installed at various installation positions and require little to no maintenance. For example, a plurality of beacons may be easily distributed across a certain area and may cover a certain area (e.g. a predetermined environment of the radio positioning system) with radio signals transmitted (e.g. broadcasted) by the beacons. Also, Bluetooth technologies are supported by many mobile devices by default such as most smartphones, most tablet computers, most notebook computers, most smart watches and most smart bands, etc. Using Bluetooth beacons may thus have the effect that many mobile devices may be able to receive radio signals transmitted by or communicate with the Bluetooth beacons without any adaptation of hardware. As a result, the approach may be globally scalable and have low maintenance and deployment costs. The beacons may be stand-alone devices or be integrated into or attached to some other device. Bluetooth beacons, in particular in low energy mode, require comparably little energy and the use of Bluetooth low energy may enable a positioning with limited energy consumption at all involved devices.

A Bluetooth beacon that is employed for the invention may be any kind of Bluetooth beacon complying with any present or future standard. The Bluetooth standards are specified by the Bluetooth Special Interest Group and are presently available under https://www.bluetooth.com/.

It is to be understood, however, that other types of radio nodes than variations of Bluetooth beacons may be used as well, for instance tags or other devices that are configured to transmit ultra-wideband (UWB) signals or any wireless radio signals that might emerge in the future.

For example, one or more radio devices of the plurality of radio devices may be an access point (e.g. a router) of a WLAN. Such an access point of a WLAN may comprise a WLAN radio interface, which for example includes a WLAN transceiver. The WLAN radio interface may be configured to transmit and/or receive WLAN radio signals. Accordingly, the radio signal transmitted by such an access point of a WLAN may be a WLAN radio signal. Like Bluetooth technologies, WLAN technologies are supported by many mobile devices by default such as most smartphones, most tablet computers, most notebook computers, most smart watches and most smart bands, etc.

WLAN is for example specified by the standards of the IEEE 802.11 family (http://www.ieee.org/). In particular, the IEEE 802.11mc standard specifies a solution for determining round-trip-time values between two WLAN devices, like a WLAN access point and a mobile device. Accordingly, the signal propagation time values represented by the plurality of signal propagation time parameters may be understood to be determined according to the IEEE 802.11mc standard.

According to an exemplary embodiment of the invention, each of the radio signal propagation time value is one of:

a round-trip-time value;

a one-way-time value.

According to an exemplary embodiment of the invention, each of the signal propagation time parameters is representative of a respective signal propagation time value determined by the mobile device. For example, a respective signal propagation time value may be determined by the mobile device at least partially based on respective time(s)-of-departure and time(s)-of-arrival captured by the mobile device and a respective radio device of the plurality of radio devices as disclosed above.

According to an exemplary embodiment of the invention, the method is performed by the mobile device.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
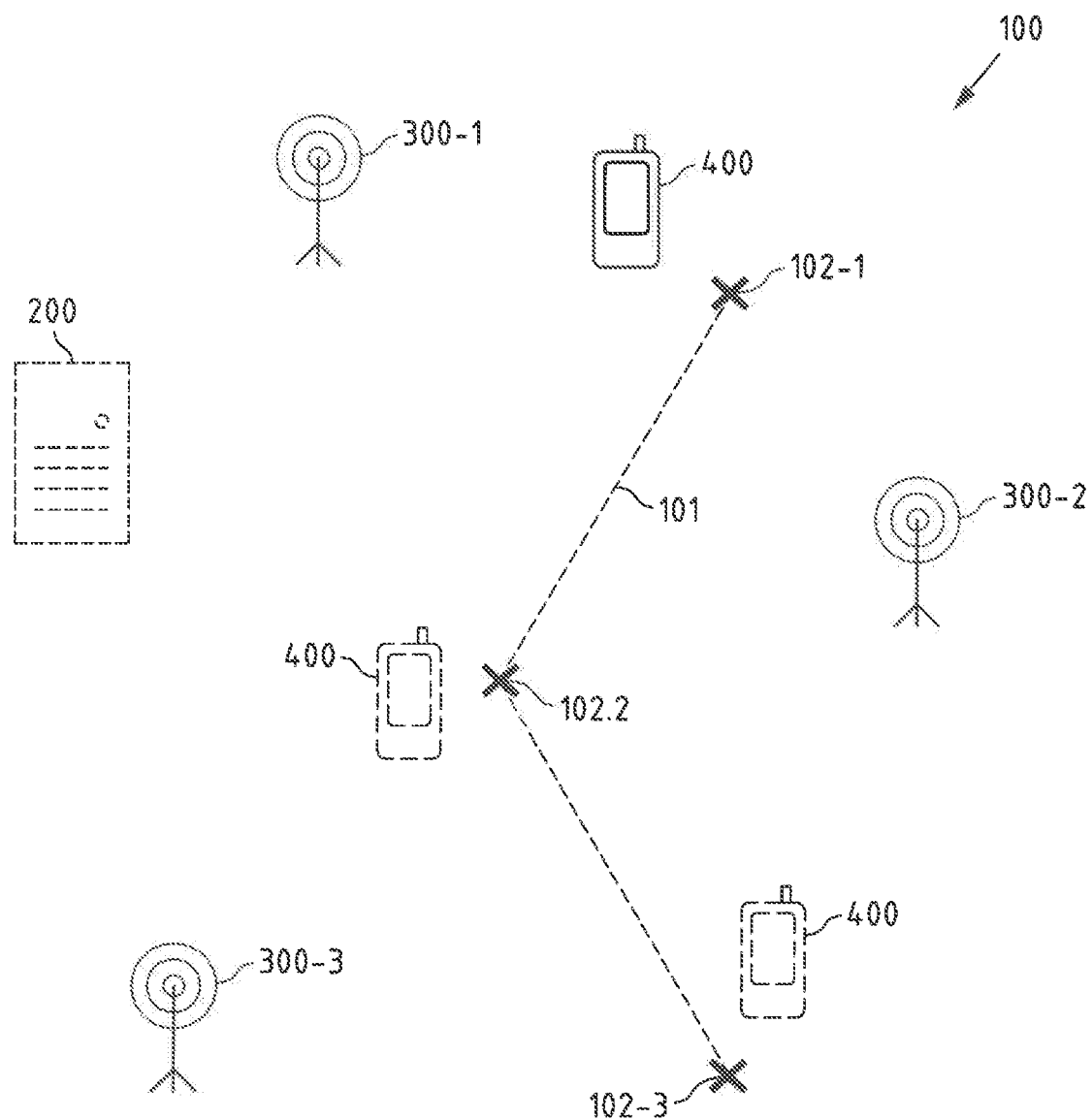
FIG. 1 is a block diagram of an exemplary embodiment of a system according to the invention.

FIG. 1 is a schematic high-level block diagram of a system 100 according to an exemplary aspect of the invention. In the following, it is assumed that system 100 is an indoor radio positioning system for a predetermined indoor environment.

System 100 comprises a mobile device 400 and a plurality of radio devices 300-1 to 300-3. Optionally, system 100 may comprise a positioning server 200. It is to be understood that system 100 may comprise further radio devices and mobile devices. In the following, it is thus referred to radio devices 300-1 to 300-3 and mobile device 400 without limiting the scope of the invention.

For example, the mobile device 400 may be one of a smartphone, a tablet computer, a notebook computer, a smart watch and a smart band.

Indoor radio positioning system 100 may optionally comprise a plurality of servers (e.g. forming a server cloud). Accordingly, the optional positioning server 200 may be part of such a plurality of servers (e.g. a server cloud) or may be represented by such a plurality of servers (e.g. a server cloud).

In system 100, the optional positioning server 200 and the mobile device 400 may be configured to communicate with each other, for example by one or more wireless communication links or one or more wireline communication links or a combination thereof. For example, the wireless communication links include communication links over a cellular communication network like a 2G/3G/4G/5G cellular communication network. The 2G/3G/4G/5G cellular radio communication standards are developed by the 3GPP and presently available under http://www.3gpp.org/.

Radio devices 300-1 to 300-3 may be WLAN access points fixedly installed in the predetermined indoor environment of system 100 and may be configured for transmitting and receiving WLAN radio signals. For example, they may be configured for automatically and repeatedly transmitting WLAN radio signals (e.g. containing or representing a service set identifier (BSSID) identifying the respective WLAN access point that has transmitted the respective WLAN radio signal). Furthermore, they may be configured to enable or support determining one or more round-trip-time values according to the IEEE 802.11mc standard. As disclosed above, WLAN is specified by the standards of the IEEE 802.11 family (http://www.ieee.org/). It is to be understood that system 100 is not limited to WLAN access points as radio devices 300-1 to 300-3. In the following, it is thus referred to radio devices 300-1 to 300-3 as WLAN access points 300-1 to 300-3 for exemplary purposes only without limiting the scope of the invention.

The mobile device 400 may be configured for determining one or more round-trip-time values. Moreover, the mobile device 400 may be configured for transmitting and receiving WLAN radio signals. For example, the mobile device 400 (like WLAN access points 300-1 to 300-3) may be configured to enable or support determining one or more round-trip-time values according to the IEEE 802.11mc standard.

As disclosed above, a round-trip-time value may be understood to represent the round-trip-time period it took for a first WLAN radio signal to travel from mobile device 400 located at a respective observation position to one of the WLAN access points 300-1 to 300-3 installed at a respective installation position and for a second WLAN radio signal to travel from the respective WLAN access point to mobile device 400. Accordingly, the round-trip-time value $RTT_{i,k}$ of radio signal travelling between WLAN access points 300-1 installed at the k-th installation position and mobile device 400 located at the i-th observation position may be determined by the following equation:

$$RTT_{i,k} = (t_4 - t_1) - (t_3 - t_2)$$

where $t_1$ is the time-of-departure of the first WLAN radio signal from mobile device 400, $t_4$ is the time-of-arrival of the second WLAN radio signal at mobile device 400, $t_3$ is the time-of-departure of the second WLAN radio signal from WLAN access point 300-1 and $t_2$ is the time-of-arrival of the first WLAN radio signal at WLAN access point 300-1. For example, mobile device 400 may transmit the first WLAN radio signal and capture times $t_4$ and $t_1$, and WLAN access point 300-1 may transmit the second WLAN radio signal and capture times $t_3$ and $t_2$. To enable mobile device 400 to determine the round-trip-time value, WLAN access point 300-1 may furthermore communicate the time-of-departure $t_3$ of the second WLAN radio signal and the time-of-arrival $t_2$ of the first WLAN radio signal to the mobile device 400 (e.g. by means of a further WLAN radio signal). Alternatively or additionally, it may be assumed that the time difference between the time-of-arrival $t_2$ of the first WLAN radio signal and the time-of-departure $t_3$ of the second WLAN radio signal is negligible or zero, for example it may be assumed that WLAN access point 300-1 transmits the second WLAN radio signal immediately in response to receiving the first WLAN radio signal.

In the following, it is assumed that each signal propagation time parameter represents such a round-trip-time value determined by the mobile device 400.

When the mobile device moves through the predetermined indoor environment of system 100, the mobile device 400 may be located at a plurality of (e.g. subsequent) observation positions over time. For example, the mobile device 400 may move along the trajectory 101 and thereby may be located at first at observation position 102-1, before it is located at observation position 102-2. Subsequently, it may be located at position 102-3. This may be the case when a user carrying the mobile device 400 moves around within the predetermined indoor environment of system 100. In the following, it is assumed that at each of observation positions 102-1, 102-2 and 102-3, the mobile device 400 transmits/receives WLAN radio signals to/from the WLAN access points 300-1 to 300-3 such that the mobile device 400 is able to determine respective round-trip-time values as disclosed above of respective radio signals travelling between the mobile device and the WLAN access points. For example, when the mobile device 400 is located at observation position 102-1, it may transmit/receive WLAN radio signals to/from WLAN access points 300-1, 300-2 and 300-3 to determine respective round-trip-time values (e.g. represented by respective signal propagation time parameters associated with this observation position 102-1. However, it may also be understood that at least one additional observation position that is occupied by the mobile device 400 may be located outside of the predetermined indoor environment of system 100.

For example, at such an observation position outside of the predetermined indoor environment of system 100, the mobile device may be unable to transmit/receive WLAN radio signals to/from any of the WLAN access points 300-1 to 300-3, but it may be able to use a GNSS based location technology to determine its absolute observation position. This may be the case when the predetermined indoor environment is for example a building and a user carrying the mobile device is located outside before entering the building and moving around within the building.

The mobile device 400 may use signal propagation time parameters determined at observation positions 102-1 to 102-3 for determining the installation positions of WLAN access points 300-1 to 300-3 and for determining motion information associated with the mobile device 400 for example by determining the observation positions 102-1 to 102-3 of the mobile device as disclosed below in more detail with respect to the flowchart 500 of FIG. 5.

Figure 2:
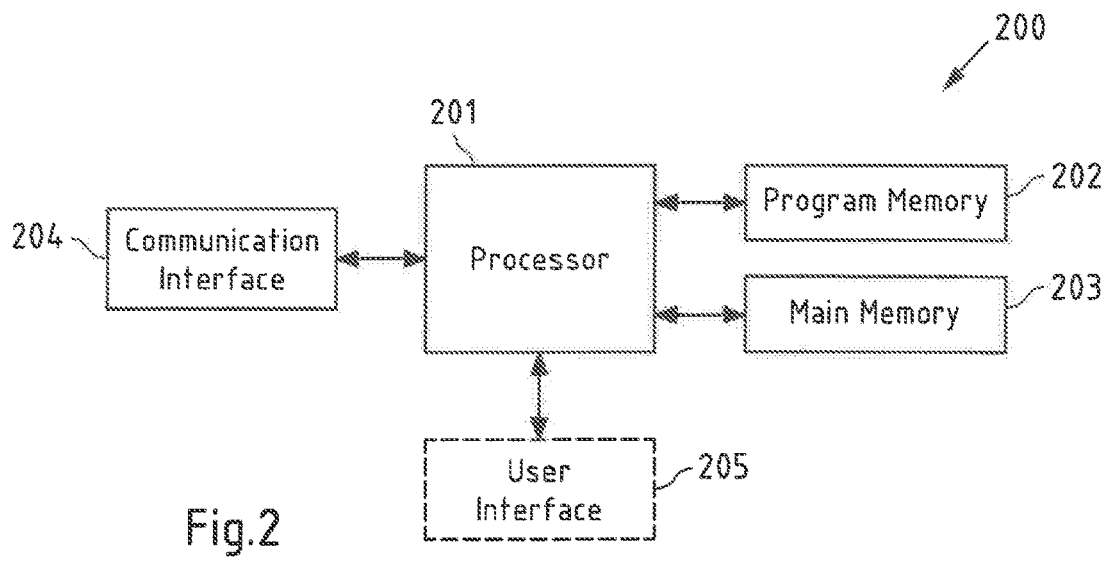
FIG. 2 is a block diagram of an exemplary embodiment of an apparatus according to the invention.

FIG. 2 is a block diagram of an exemplary embodiment of positioning server according to the invention. In the following, it is assumed that this positioning server corresponds to the optional positioning server 200 of system 100 of FIG. 1.

Positioning server 200 comprises a processor 201. Processor 201 may represent a single processor or two or more processors, which are for instance at least partially coupled, for instance via a bus. Processor 201 executes a program code stored in program memory 202, and interfaces with a main memory 203. Program memory 202 may also contain an operating system for processor 201. Some or all of memories 202 and 203 may also be included into processor 201.

One of or both of a main memory and a program memory of a processor (e.g. program memory 202 and main memory 203) could be fixedly connected to the processor (e.g. processor 201) or at least partially removable from the processor, for instance in the form of a memory card or stick.

A program memory (e.g. program memory 202) may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 203) may for instance be a volatile memory. It may for instance be a DRAM memory, to give non-limiting example. It may for instance be used as a working memory for a processor (e.g. processor 201) when executing an operating system and/or programs.

Processor 201 further controls a communication interface 204 which is for example configured to communicate via a network like a cellular communication network. Positioning server 200 may use communication interface 204 to communicate with the mobile device 400.

Furthermore, processor 201 controls an optional user interface 205 configured to present information to a user of positioning server 200 and/or to receive information from such a user. User interface 205 may for instance be the standard user interface via which a user of positioning server 200 controls other functionality thereof. Examples of such a user interface are a touch-sensitive display, a keyboard, a touchpad, a display, etc.

The components 202 to 205 of positioning server 200 may for instance be connected with processor 201 by means of one or more serial and/or parallel busses.

It is to be understood that positioning server 200 may comprise various other components.

Figure 3:
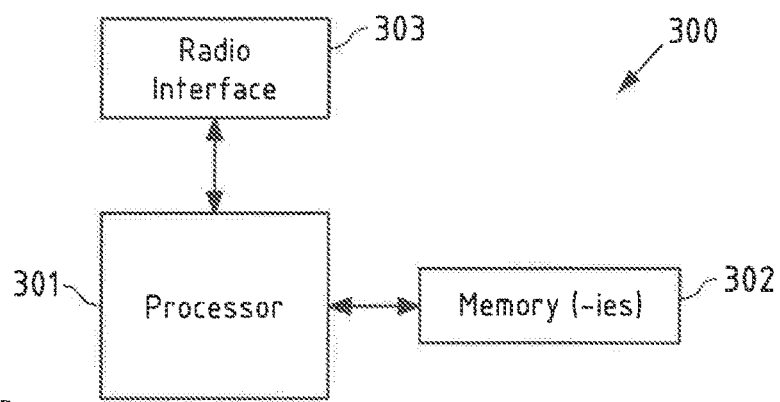
FIG. 3 is a block diagram of an exemplary embodiment of a radio device.

FIG. 3 is a block diagram of an exemplary embodiment of a radio device according to the invention. In the following, it is assumed that this radio device corresponds to a WLAN access point 300 like WLAN access points 300-1 to 300-3 of system 100.

WLAN access point 300 comprises a processor 301. Processor 301 may represent a single processor or two or more processors, which are for instance at least partially coupled, for instance via a bus. Processor 301 executes a program code stored in memory 302. Some or all of memory 302 may also be included into processor 301. Memory 302 may for instance be a volatile or non-volatile memory. It may for instance be a RAM or DRAM memory. It may for instance be a FLASH memory (or a part thereof), any of a ROM, PROM, EPROM, EEPROM, MRAM or a FeRAM (or a part thereof) and/or a hard disc (or a part thereof), to name but a few examples. It may for instance be used as a working memory for processor 301 when executing an operating system and/or programs. Memory 302 may also comprise an operating system for processor 301. Memory 302 may for instance comprise a first memory portion that is fixedly installed in WLAN access point 300, and a second memory portion that is removable from WLAN access point 300, for instance in the form of a removable SD memory card.

Processor 301 further controls a radio interface 303 configured to receive and/or transmit WLAN radio signals. For instance, radio interface 303 may at least comprise a WLAN component including a WLAN transmitter (TX). The radio interface 303 may additionally comprise a WLAN receiver (RX). The transmitter and receiver may also be part of a WLAN transceiver (TRX). The WLAN transmitter enables WLAN access point 300 to transmit WLAN radio signals. Likewise, the WLAN receiver enables WLAN access point 300 to receive WLAN radio signals. Moreover, the radio interface 303 may be configured to support determining one or more round-trip-time values according to the IEEE 802.11mc standard, for example by capturing times-of-arrival and/or times-of-departure as disclosed above in more detail. It is to be understood that any computer program code based processing required for receiving and processing received WLAN radio signals may be stored in an own memory of the radio interface 303 and executed by an own processor of the radio interface 303 or it may be stored for example in memory 302 and executed for example by processor 301.

It is to be understood that WLAN access point 300 may comprise various other components.

Figure 4:
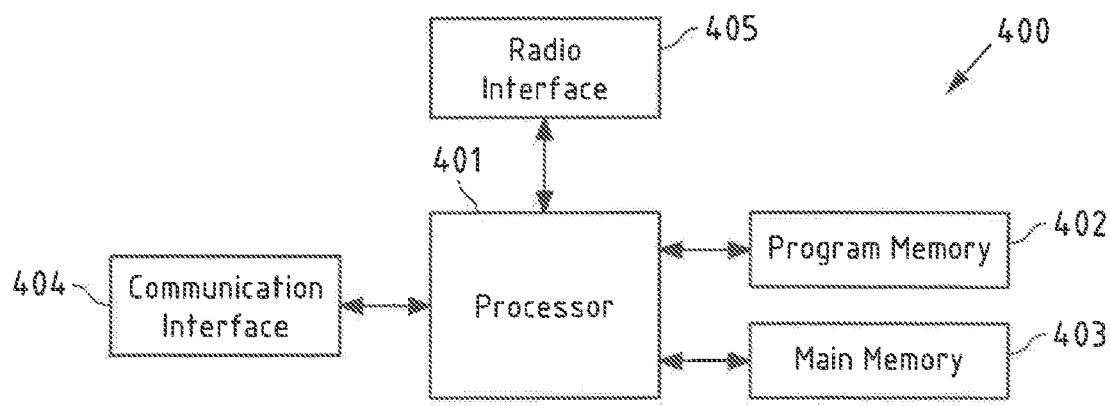
FIG. 4 is a block diagram of an exemplary embodiment of a mobile device.

FIG. 4 is a block diagram of an exemplary embodiment of a mobile device according to the invention. In the following, it is assumed that this mobile device corresponds to mobile device 400 of system 100 of FIG. 1.

Mobile device 400 comprises a processor 401. Processor 401 may represent a single processor or two or more processors, which are for instance at least partially coupled, for instance via a bus. Processor 401 executes a program code stored in program memory 402 (for instance program code causing mobile device 400 to perform one or more of the embodiments of a method according to the invention or parts thereof (e.g. the method or parts of the method disclosed below with reference to flowchart 500 of FIG. 5), when executed on processor 4201) and interfaces with a main memory 403. Program memory 402 may also comprise an operating system for processor 401. Some or all of memories 402 and 403 may also be included into processor 401.

Processor 401 controls a communication interface 404 which is for example configured to communicate via a network like a cellular communication network. Mobile device 400 may use communication interface 404 to communicate with the optional positioning server 200.

Moreover, processor 401 controls radio interface 405 configured to receive and/or transmit WLAN radio signals. For instance, radio interface 405 may at least comprise a WLAN component including a WLAN transmitter (TX). The radio interface 405 may additionally comprise a WLAN receiver (RX). The transmitter and receiver may also be part of a WLAN transceiver (TRX). The WLAN transmitter enables mobile device 400 to transmit WLAN radio signals. Likewise, the WLAN receiver enables mobile device 400 to receive WLAN radio signals. Moreover, the radio interface 405 may be configured to support determining one or more round-trip-time values according to the IEEE 802.11mc standard, for example by capturing times-of-arrival and/or times-of-departure as disclosed above in more detail. It is to be understood that any computer program code based processing required for receiving and processing received WLAN radio signals may be stored in an own memory of the radio interface 405 and executed by an own processor of the radio interface 405 or it may be stored for example in memory 402 and executed for example by processor 401.

The components 402 to 405 of mobile device 400 may for instance be connected with processor 401 by means of one or more serial and/or parallel busses.

It is to be understood that mobile device 400 may comprise various other components. For example, mobile device 400 may optionally comprise a user interface (e.g. a touch-sensitive display, a keyboard, a touchpad, a display, etc.).

Figure 5:
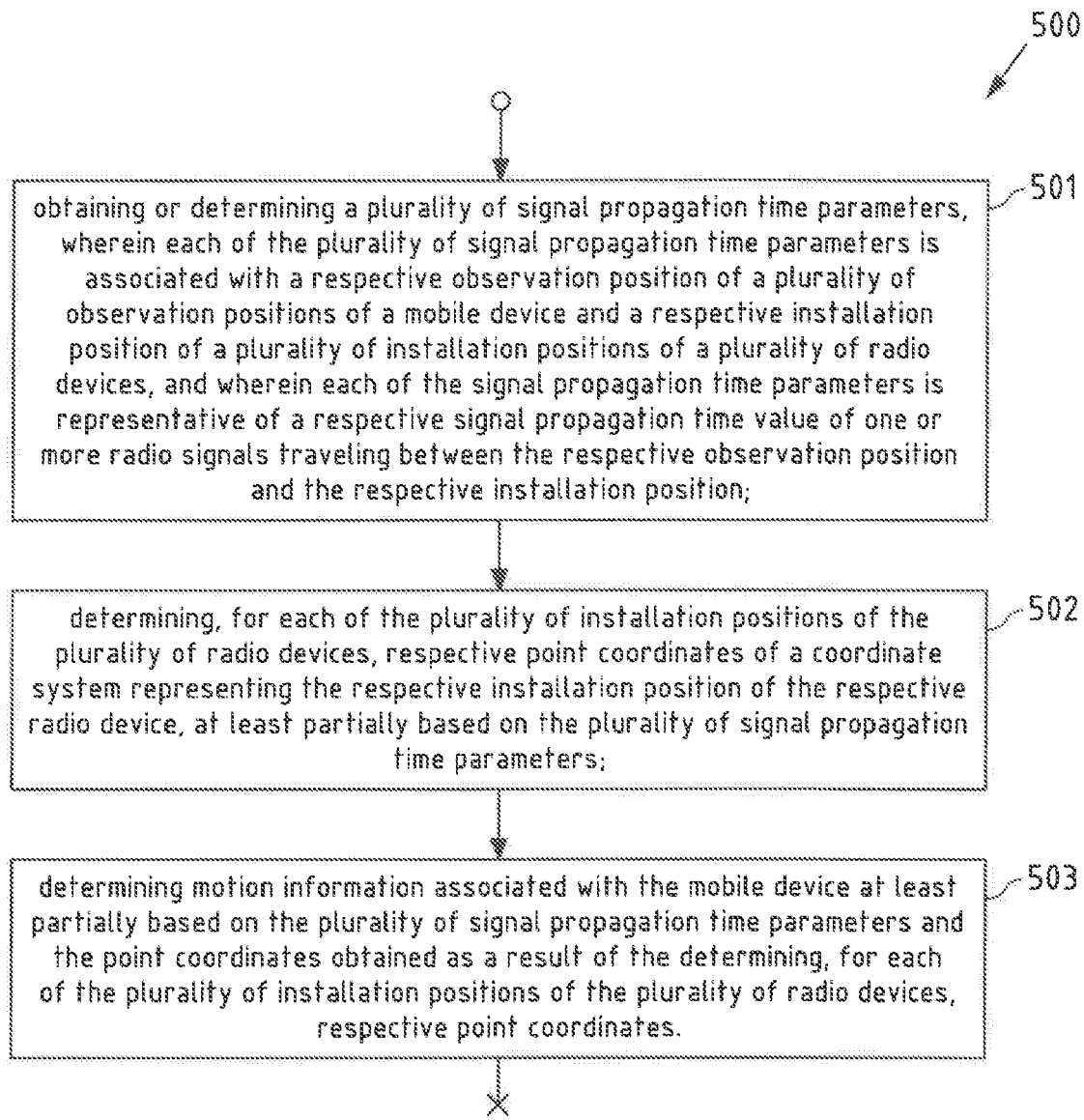
FIG. 5 is a flow chart illustrating an exemplary embodiment of a method according to the invention.

FIG. 5 is a flow chart 500 illustrating an exemplary embodiment of a method according to the invention. Without limiting the scope of the invention, it is assumed in the following that mobile device 400 of indoor radio positioning system 100 as described above with respect to FIG. 1 performs the steps of flowchart 500.

In step 501, a plurality of signal propagation time parameters is determined or obtained, wherein each of the plurality of signal propagation time parameters is associated with a respective observation position of a plurality of observation positions of mobile device 400 and a respective installation position of a plurality of installation positions of the plurality of radio devices 300-1 to 300-3, and wherein each of the signal propagation time parameters is representative of a respective signal propagation time value of one or more radio signals traveling between the respective observation position and the respective installation position.

For example, each signal propagation time parameter of the plurality of signal propagation time parameters represents a respective round-trip-time value determined by the mobile device 400. As disclosed in more detail above, a respective round-trip-time value $RTT_{i,k}$ may be understood to represent the round-trip-time period it took for a first WLAN radio signal to travel from mobile device 400 located at the i-th observation position to one of the WLAN access points 300-1 to 300-3 installed at the k-th installation position to the and for a second WLAN radio signal to travel from the respective WLAN access point to mobile device 400. Accordingly, the respective signal propagation time parameter of the plurality of signal propagation time parameters representing the respective round-trip-time value $RTT_{i,k}$ may be understood to be associated with the k-th installation position and the i-th observation position.

In the following, it is assumed that i·k signal propagation time parameters each of which representing a respective round-trip-time value $RTT_{i,k}$ are determined in step 501 by the mobile device 400 and that k=3 and i=3. It is however to be understood that the signal propagation time parameters are not determined by the mobile device 400 at once in step 501, but may at least partially be determined subsequently by mobile device 400.

In step 502, for each of the plurality of installation positions of the plurality of radio devices 300-1 to 300-3, respective point coordinates of a coordinate system representing the respective installation position of the respective radio device are determined at least partially based on the plurality of signal propagation time parameters.

For example, the determining in step 502 may be performed by solving a non-linear equation system, wherein the non-linear equation system is formed by a plurality of signal propagation time equations, and wherein each of the plurality of signal propagation time equations is at least partially based on a respective signal propagation time value represented by a respective signal propagation time parameter of the plurality of signal propagation time parameters, wherein the plurality of signal propagation time parameters may be obtained or determined in step 501.

Examples of such a signal propagation time equation are:

$$c \cdot RTT_{i,k} = 2 \| \underline{x}_i - \underline{y}_k \|$$

where $\underline{x}_i$ represents the i-th observation position, $\underline{y}_k$ represents the k-th installation position, $RTT_{i,k}$ represents a round-trip-time value of a radio signal travelling between the k-th installation position and the i-th observation position, and c represents the speed of light. Therein, the round-trip-time value $RTT_{i,k}$ may be understood to be represented by a respective signal propagation time parameter of the plurality of signal propagation time parameters associated with the k-th installation position and the i-th observation position. In the following it is assumed that $\underline{x}_i$ and $\underline{y}_k$ are two dimensional vectors and that all k installation positions and all i observation positions are unknown. Within this example, the the number of signal propagation time equations is i·k and the number of unknowns is 2·i+2·k ((i.e. two point coordinates for each installation position and each observation position).

The non-linear equation system formed by these signal propagation time equations may for example be solved according to the Levenberg-Marquardt algorithm. For example, the problem defined by the non-linear equation system may be simply expressed as follows $$F\begin{pmatrix} x \\ y \end{pmatrix} = 0,$$

where $\underline{x}$ and $\underline{y}$ are the vectors representing point coordinates representing the k installation positions and the i observation positions, respectively. The solution of this problem determines, for each of the k installation positions and the i observation positions, respective point coordinates such that the signal propagation time equations are fulfilled. Accordingly, the point coordinates obtained as a solution of the problem may be considered to be a representation of relative locations of the plurality of installation positions (i.e. k installation positions) and the plurality of observation positions (i.e. i observation positions). Each of these point coordinates may be understood to represent one of (1) a respective installation position of the plurality of installation positions and (2) a respective observation position of the plurality of observation positions.

It is further assumed in the following that x and y may be vectors representing point coordinates of a local coordinate system, which may for example be defined by selecting a signal propagation time parameter of the plurality of signal propagation time parameters and by selecting first point coordinates of the local coordinate system to represent the installation position associated with the selected signal propagation time parameter and by selecting second point coordinates of the local coordinate system to represent the observation position associated with the selected signal propagation time parameter. The first point coordinates may be selected to be origin coordinates of the local coordinate system and the second point coordinates may be selected such that the distance between the first point coordinates and the second point coordinates is a (e.g. scaled or unscaled) representation of the distance between the respective installation position and the respective observation position. Moreover, it is assumed in the following that the first point coordinates represent the first installation position (i.e. k=1) and the second point coordinates represent the first observation position (i=1). Accordingly, the respective distance value $d_{1,1}$ representing the distance between the first installation position (i.e. k=1) and the first observation position (i=1) may be determined based on the respective round-trip-time value $RTT_{1,1}$ by the following equations:

$$d_{1,1} = RTT_{1,1} \cdot \frac{c}{2}$$

where c is the speed of light.

Based on the above assumptions and further assuming that the local coordinate system may be a two-dimensional Cartesian coordinate system, the first point coordinates may then be represented by the following two-dimensional vector:

$$y_1 = \begin{pmatrix} 0 \\ 0 \end{pmatrix},$$

and the second point coordinates may then be represented by the following two-dimensional vector:

$$x_1 = \begin{pmatrix} 0 \\ d_{1,1} \end{pmatrix}.$$

As a result, the number of signal propagation time equations to be solved in step 503 is reduced by 1 (i.e. i·k−1) and the number of unknowns by 4 (i.e. 2·i+2·k−4) within the above described example.

If the non-linear equation system is solved based on these assumptions, the point coordinates obtained as a solution of the problem together with the first point coordinates and the second point coordinates may be considered to be a representation of relative locations of the plurality of installation positions (i.e. k installation positions) and the plurality of observation positions (i.e. i observation positions) in the local coordinate system.

In step 503, motion information associated with the mobile device are determined at least partially based on the plurality of signal propagation time parameters and the point coordinates obtained as a result of the determining, for each of the plurality of installation positions of the plurality of radio devices, respective point coordinates.

As disclosed above, the point coordinates of observation positions 102-1, 102-2 and 102-3 may be obtained from solving the problem according to the Levenberg-Marquardt algorithm in step 502. As disclosed with respect to FIG. 1, it may be assumed that the mobile device 400 may move along trajectory 101 and thereby may be located at first at observation position 102-1, before it is located at observation position 102-2. Subsequently, it may be located at position 102-3. This may be the case when a user carrying mobile device 400 moves around within the predetermined indoor environment of system b 100. Accordingly, motion information determined in step 503 may represent this trajectory 101 by representing observation positions 102-1, 102-2 and 102-3 in chronological order, for example by representing or containing the point coordinates representing observation positions 102-1, 102-2 and 102-3 in the local coordinate system. #

Alternatively or additionally, motion information determined in step 503 may represent the distance traveled by mobile device 400 while moving along trajectory 101. To this end, the distance may be determined based on the distance between the point coordinates representing observation positions 102-1 and 102-2 and the distance between the point coordinates representing observation positions 102-1 and 102-3 in the local coordinate system. For example, the motion information may represent or contain a distance value representing the sum of the distances between the point coordinates representing observation positions 102-1 and 102-2 and between the point coordinates representing observation positions 102-1 and 102-3 in the local coordinate system.

Additionally, the respective point coordinates representing each of observation positions 102-1, 102-2 and 102-3 may additionally include a respective time stamp as time information, which represents the respective time at which mobile device 400 was located at the respective observation positions 102-1, 102-2 and 102-3. Accordingly, motion information determined in step 503 may also represent the average speed at which mobile device 400 moves between two consecutive observation positions 102-1 and 102-2 or 102-2 and 102-3 of trajectory 101. As disclosed above in more detail, motion information determined in step 503 may further represent a speed profile, an acceleration (e.g. the average acceleration) or an acceleration profile as well as a motion direction of the mobile device 400 moving along trajectory 101.

Motion information determined according to step 503 represent the motion of mobile device 400 without relying on conventional motion sensors. This may be advantageous, since conventional motion sensors may have several shortcomings for example by relying on step detection, estimating the step length of a user carrying mobile device 400 and determining the device orientation of mobile device 400 before and/or after turns. As another advantage, motion information according to step 503 may be determined even if at least some (for example each) of the plurality of installation positions of the plurality of radio devices are unknown before performing the disclosed method. As another advantage, steps 501, 502 and 503 may be performed by any mobile device, which may allow for a flexible and effortless implementation of the disclosed method.

As illustrated in the example of FIG. 1, it may be assumed in the following that the mobile device 400 is located subsequently at three observation positions 102-1, 102-2 and 102-3, for example because a user carrying the mobile device 400 moves around in the predetermined indoor environment of system 100. At each of the three observation positions 102-1, 102-2 and 102-3, the mobile device 400 may determine signal propagation time parameters representing the respective round-trip-value $RTT_{i,k}$ associated with the current observation position of the mobile device 400 and the respective installation positions of WLAN access points 300-1 to 300-3. For example, when being located at the first observation position 102-1, the mobile device 400 may determine respective round-trip-values associated with the observation position 102-1 and each of the installation positions of WLAN access points 300-1 to 300-3. Subsequently, when being located at the second observation position 102-2, the mobile device 400 may determine respective round-trip-values associated with the observation position 102-2 and each of the installation positions of WLAN access points 300-1 to 300-3. Eventually, when being located at the third observation position 102-3, the mobile device 400 may determine respective round-trip-values associated with the observation position 102-3 and each of the installation positions of WLAN access points 300-1 to 300-3. In this example, considering that the mobile device 400 has been located at i=3 observation positions and that the mobile device 400 as determined round-trip-values associated with WLAN access points at k=3 installation positions, 3*3=9 RTT measurements have been performed in total.

Figure 6:
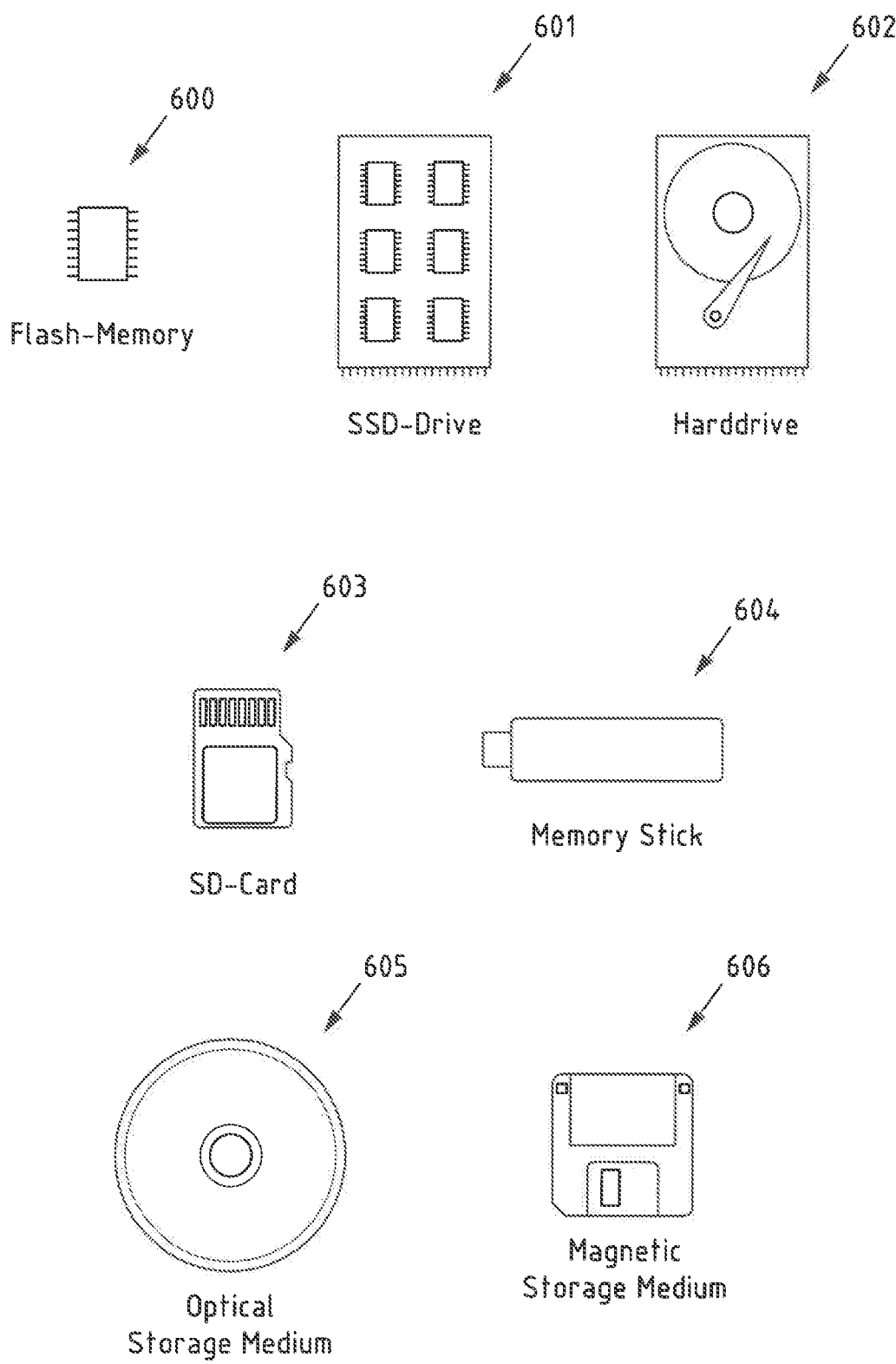
FIG. 6 is a schematic illustration of examples of tangible and non-transitory storage media according to the invention.

FIG. 6 is a schematic illustration of examples of tangible and non-transitory computer-readable storage media according to the present invention that may for instance be used to implement memory 202 of FIG. 2, memory 302 of FIG. 3 and memory 402 of FIG. 4. To this end, FIG. 6 displays a flash memory 600, which may for instance be soldered or bonded to a printed circuit board, a solid-state drive 601 comprising a plurality of memory chips (e.g. Flash memory chips), a magnetic hard drive 602, a Secure Digital (SD) card 603, a Universal Serial Bus (USB) memory stick 604, an optical storage medium 605 (such as for instance a CD-ROM or DVD) and a magnetic storage medium 606.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to sections of processor(s)/software (including digital signal processor(s)), software, and memory(ies) that work together to cause an apparatus, such as a mobile phone, to perform various functions) and (c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 201, 301 and 401 of FIGS. 2, 3 and 4, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method for determining motion information associated with motion of a mobile device, the method comprising:
    obtaining or determining a plurality of signal propagation time parameters, wherein each of said plurality of signal propagation time parameters is associated with a respective observation position of a plurality of observation positions of a mobile device and a respective installation position of a plurality of installation positions of a plurality of radio devices, and wherein each of said signal propagation time parameters is representative of a respective signal propagation time value of one or more radio signals traveling between said respective observation position and said respective installation position,
    determining respective relative locations of said plurality of installation positions of said plurality of radio devices based at least on said plurality of signal propagation time parameters and the associated respective observation position of the plurality of observation positions, wherein said respective relative locations indicate the relative locations of each of said plurality of radio devices with respect to the others of said plurality of radio devices, determining, for each of said plurality of installation positions of said plurality of radio devices, respective point coordinates of a coordinate system representing said respective installation position of said respective radio device based at least in part on the respective relative locations of said plurality of installation positions, and determining motion information associated with said mobile device at least partially based on said plurality of signal propagation time parameters and said point coordinates obtained as a result of said determining, for each of said plurality of installation positions of said plurality of radio devices, respective point coordinates.

2. The method according to claim 1, said method further comprising:

determining, for each of said plurality of observation positions, respective point coordinates of said coordinate system representing said respective observation position at least partially based on said plurality of signal propagation time parameters.

3. The method according to claim 1, said method further comprising:

selecting a signal propagation time parameter of said plurality of signal propagation time parameters for defining said coordinate system, wherein first point coordinates of said coordinate system are selected to represent said installation position associated with said selected signal propagation time parameter, and second point coordinates of said coordinate system are selected to represent said observation position associated with said selected signal propagation time parameter, and wherein said first point coordinates and said second point coordinates are selected such that a distance between said first point coordinates and said second point coordinates is proportional to said signal propagation time value represented by said selected signal propagation time parameter.

4. The method according to claim 1, wherein said motion information associated with said mobile device represents at least one of the following:

a distance travelled by said mobile device, a speed or speed profile of said mobile device, an acceleration or an acceleration profile of said mobile device, a motion direction or a motion orientation of said mobile device, or a trajectory of said mobile device.

5. The method according to claim 1, wherein said plurality of observation positions are subsequent positions of said mobile device.

6. The method according to claim 1, wherein said coordinate system is a two-dimensional or three-dimensional coordinate system.

7. The method according to claim 1, said method further comprising:

determining, for at least one of said respective point coordinates representing said plurality of observation positions and/or for at least one of said respective point coordinates representing said plurality of installation positions, a respective absolute position.

8. The method according to claim 1, wherein determining the respective relative locations of said plurality of installation positions of said plurality of radio devices comprises defining and determining a solution of a non-linear equation system to determine respective relative locations of said plurality of installation positions of said plurality of radio devices, wherein said non-linear equation system is formed by a plurality of signal propagation time equations, a signal propagation time equation of the plurality of signal propagation time equations corresponding to a particular signal propagation time parameter corresponding to an ith observation position of the plurality of observation positions and a kth installation position of the plurality of installation positions is of the form $cT = a\|x_i - y_k\|$, where c is a signal propagation speed, T is the particular signal propagation time parameter, $x_i$ is the ith observation position, and $y_k$ is the kth installation position, and the constant a is equal to one when the particular signal propagation time parameter is a one way time value and a is equal to two when the particular signal propagation time parameter is round trip time value.

9. The method according to claim 8, wherein said determining, for each of said plurality of installation positions of said plurality of radio devices, respective point coordinates of a coordinate system representing said respective installation position of said respective radio device further comprises determining said plurality of signal propagation time equations by:

determining, for each of said plurality of signal propagation time parameters, a respective signal propagation time equation of said plurality of respective signal propagation time equations, wherein said respective point coordinates representing each of said plurality of installation positions associated with said respective signal propagation time parameter is an unknown variable of said respective signal propagation time equation, and wherein said respective signal propagation time value represented by said respective signal propagation time parameter is a parameter of said respective signal propagation time equation.

10. The method according to claim 8, wherein said non-linear equation system is solved according to the Levenberg-Marquardt algorithm.

11. The method according to claim 1, wherein each of said radio signal propagation time value is one of:

a round-trip-time value; or a one-way-time value.

12. The method according to claim 1, wherein each of said signal propagation time parameters is representative of a respective signal propagation time value determined by said mobile device.

13. The method according to claim 1, wherein the method is performed by said mobile device.

14. A non-transitory computer readable storage medium storing computer program code, the computer program code when executed by a processor of an apparatus causing said apparatus to:

obtain or determine a plurality of signal propagation time parameters, wherein each of said plurality of signal propagation time parameters is associated with a respective observation position of a plurality of observation positions of a mobile device and a respective installation position of a plurality of installation positions of a plurality of radio devices, and wherein each of said signal propagation time parameters is representative of a respective signal propagation time value of one or more radio signals traveling between said respective observation position and said respective installation position, determine respective relative locations of said plurality of installation positions of said plurality of radio devices based at least on said plurality of signal propagation time parameters and the associated respective observation position of the plurality of observation positions, wherein said respective relative locations indicate the relative locations of each of said plurality of radio devices with respect to the others of said plurality of radio devices, determine, for each of said plurality of installation positions of said plurality of radio devices, respective point coordinates of a coordinate system representing said respective installation position of said respective radio device based at least in part on the respective relative locations of said plurality of installation positions, and determine motion information associated with said mobile device at least partially based on said plurality of signal propagation time parameters and said point coordinates obtained as a result of said determining, for each of said plurality of installation positions of said plurality of radio devices, respective point coordinates.

15. An apparatus comprising at least one processor and at least one memory containing computer program code, the at least one memory and the computer program code configured, with the at least one processor, to cause the apparatus at least to:

obtain or determine a plurality of signal propagation time parameters, wherein each of said plurality of signal propagation time parameters is associated with a respective observation position of a plurality of observation positions of a mobile device and a respective installation position of a plurality of installation positions of a plurality of radio devices, and wherein each of said signal propagation time parameters is representative of a respective signal propagation time value of one or more radio signals traveling between said respective observation position and said respective installation position, determine respective relative locations of said plurality of installation positions of said plurality of radio devices based at least on said plurality of signal propagation time parameters and the associated respective observation position of the plurality of observation positions, wherein said respective relative locations indicate the relative locations of each of said plurality of radio devices with respect to the others of said plurality of radio devices, determine, for each of said plurality of installation positions of said plurality of radio devices, respective point coordinates of a coordinate system representing said respective installation position of said respective radio device based at least in part on the respective relative locations of said plurality of installation positions, and determine motion information associated with said mobile device at least partially based on said plurality of signal propagation time parameters and said point coordinates obtained as a result of said determining, for each of said plurality of installation positions of said plurality of radio devices, respective point coordinates.

16. The apparatus according to claim 15, wherein the at least one memory and the computer program code are further configured, with the at least one processor, to cause the apparatus to determine, for each of said plurality of observation positions, respective point coordinates of said coordinate system representing said respective observation position at least partially based on said plurality of signal propagation time parameters.

17. The apparatus according to claim 15, wherein the at least one memory and the computer program code are further configured, with the at least one processor, to cause the apparatus to select a signal propagation time parameter of said plurality of signal propagation time parameters for defining said coordinate system, wherein first point coordinates of said coordinate system are selected to represent said installation position associated with said selected signal propagation time parameter, and second point coordinates of said coordinate system are selected to represent said observation position associated with said selected signal propagation time parameter, and wherein said first point coordinates and said second point coordinates are selected such that a distance between said first point coordinates and said second point coordinates is proportional to said signal propagation time value represented by said selected signal propagation time parameter.

18. The apparatus according to claim 15, wherein the at least one memory and the computer program code are further configured, with the at least one processor, to cause the apparatus to determine, for at least one of said respective point coordinates representing said plurality of observation positions and/or for at least one of said respective point coordinates representing said plurality of installation positions, a respective absolute position.

19. The apparatus according to claim 15, wherein determining the respective relative locations of said plurality of installation positions of said plurality of radio devices comprises defining and determining a solution of a non-linear equation system to determine respective relative locations of said plurality of installation positions of said plurality of radio devices, wherein said non-linear equation system is formed by a plurality of signal propagation time equations, a signal propagation time equation of the plurality of signal propagation time equations corresponding to a particular signal propagation time parameter corresponding to an ith observation position of the plurality of observation positions and a kth installation position of the plurality of installation positions is of the form $cT=a\|x_i-y_k\|$, where c is a signal propagation speed, T is the particular signal propagation time parameter, $x_i$ is the ith observation position, and $y_k$ is the kth installation position, and the constant a is equal to one when the particular signal propagation time parameter is a one way time value and a is equal to two when the particular signal propagation time parameter is round trip time value.

20. The apparatus according to claim 15, wherein the at least one memory and the computer program code are further configured, with the at least one processor, to cause the apparatus to determine, for each of said plurality of installation positions of said plurality of radio devices, respective point coordinates of a coordinate system representing said respective installation position of said respective radio device by determining, for each of said plurality of signal propagation time parameters, a respective signal propagation time equation of said plurality of respective signal propagation time equations, wherein said respective point coordinates representing each of said plurality of installation positions associated with said respective signal propagation time parameter is an unknown variable of said respective signal propagation time equation, and wherein said respective signal propagation time value represented by said respective signal propagation time parameter is a parameter of said respective signal propagation time equation.

* * * * *